US008061568B2

(12) United States Patent
Fenton

(10) Patent No.: US 8,061,568 B2
(45) Date of Patent: Nov. 22, 2011

(54) FIBER FILLING MACHINE

(76) Inventor: Janis E. Fenton, Coeur d'Alene, ID (US)

( * ) Notice: Subject to any disclaimer, the term of this patent is extended or adjusted under 35 U.S.C. 154(b) by 834 days.

(21) Appl. No.: 11/544,441

(22) Filed: Sep. 28, 2006

(65) Prior Publication Data

US 2008/0078784 A1 Apr. 3, 2008

(51) Int. Cl.
*A01C 15/04* (2006.01)

(52) U.S. Cl. .......... 222/636; 222/65; 222/135; 222/238; 366/279; 366/325.6; 241/98

(58) Field of Classification Search .................. 222/630, 222/636, 637, 226–228, 342, 236–238, 348, 222/349, 367, 368, 370; 406/56, 65, 62, 406/63, 66–68, 52, 134, 135; 366/279, 290–292, 366/325.6–325.8; 241/98
See application file for complete search history.

(56) References Cited

U.S. PATENT DOCUMENTS 1,354,415 A * 9/1920 Nepstad ........................ 366/290
2,367,311 A * 1/1945 Reece ........................... 222/338
2,521,398 A * 9/1950 North .............................. 99/466
2,984,872 A * 5/1961 France .......................... 19/48 R
3,851,925 A 12/1974 Roberson
4,465,239 A * 8/1984 Woten ............................. 241/98
4,664,160 A 5/1987 Rothstein et al.
5,199,244 A 4/1993 Beier et al.
5,247,722 A 9/1993 Leifeld
5,829,649 A 11/1998 Horton
6,109,488 A * 8/2000 Horton .......................... 222/636
6,860,092 B2 3/2005 Collida et al.

* cited by examiner

*Primary Examiner* — J Casimer Jacyna

(57) ABSTRACT

A fiber blowing and filling machine comprising a hopper, a dispensing assembly located below the hopper, a drive assembly and a blower. The dispensing assembly comprises a housing having two longitudinally opposite apertures, namely, an air inlet aperture connected to the output of the blower and an exit aperture. The housing is equipped with a paddle mounted to a shaft that is above the apertures. The paddle is assembled from individual components, forming a plurality of vanes having flexible edges that contact the surfaces of the housing to create a pocket when the apertures are between a pair of the vanes. The fiber from the hopper flows into the housing and gets collected between a pair of the vanes, which rotate further to form the pocket. The fiber in the pocket is then blown out through the exit aperture by the air from the blower output.

17 Claims, 10 Drawing Sheets

FIBER FILLING MACHINE

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to machines for stuffing loose material such as fiber, and more particularly to a fiber filling machine for creating stuffed products such as soft toys, pillows, and the like without using compressors.

Fiber filling systems use compressors and blowers along with other devices to manipulate and guide fiber material into products. Manipulating or processing raw fiber may involve breaking down or fluffing the fiber, requiring custom devices to meet quality standards and achieve the desired feel and texture of the stuffed products. Fiber filling systems also typically comprise hoppers, fiber passageways and housings for various components. In these systems, processed fiber is guided or blown through hoppers and passageways.

Several fiber filling systems have been developed in the art. For example, U.S. Pat. No. 6,860,092 to Collida discloses a fiber stuffing and fluffing machine for fiber stuffing toys, pillows, and the like. The machine has a venturi vacuum system, an agitation cavity and blade arrangement, and various mechanical and electrical features. The machine is integrated into a single stand alone unit and performs fluffing and stuffing operations without external pneumatic sources. The machine utilizes a blast gate that is highly resistant to clogging and fiber buildup. The machine also utilizes scroll compressors or turbine compressors and provides means for separating foreign objects from the ingested stuffing fibers. This machine is different from the present invention, which does not employ any compressors and comprises different components.

U.S. Pat. No. 4,664,160 to Rothstein discloses a fiber filling system for feeding and stuffing a quantity of fiber material. The system comprises a picking device for separating clumped fiber that feeds to an air and fiber circulation chamber. The circulation chamber aerates and fluffs the separated fiber into a fibrous billow, which is then discharged to a stuffing chute. A stuffable article, such as a toy, pillow, or furniture cushion casing is attached to the chute and is filled with the fibrous billow. The circulation chamber creates a cyclonic flow to provide sufficient fluffing and aerating of the fiber materials, such that fibers in a wide range of densities and fiber lengths can be processed. However, the picking device and circulation chamber along with their functional aspects differ from the present invention.

In U.S. Pat. No. 5,829,649 to Horton discloses a machine for conditioning and dispensing loose fill insulation material, such as cellulose insulation, fiber glass insulation and rock wool insulation. The machine includes a hopper, a conditioning chamber, an air lock chamber and a blower for pneumatically dispensing the material. The conditioning chamber is equipped with three rotating shafts with helically arranged spikes which serve as conveyors as well as dispersers. A lower conveyor shaft moves the material toward the opening into the air lock, while the two uppermost conveyor shafts move the material in the opposite direction. The air lock chamber comprises a cylinder, a shaft mounted longitudinally in the cylinder and a plurality of blades or vanes extending from the shaft. The edges of the vanes contact the inner wall of the cylinder to create pockets. A single motor drives the rotation of the conveyor shafts and the rotation of the vanes.

The Horton's apparatus as a whole, especially the conditioning chamber and its components, is different from the present invention. Although the air lock chamber of the Horton's apparatus appears similar, the present invention is different in that it includes specially designed vanes and housing enclosing the vanes for achieving substantially isolated pockets. Moreover, in the present invention, the vanes are designed to allow air flow and fiber to blow back into the hopper to prevent clogging.

It is therefore an object of the present invention to provide an improved fiber filling machine that comprises different fiber handling and filling procedures and uses specially designed components.

A further object is to provide an improved fiber filling machine for stuffing toys, pillows and the like without the use of compressors.

Finally, it is an object of the present invention to provide a fiber filling machine that includes a dispensing assembly with specially designed paddle assembly having a plurality of vanes for creating substantially isolated pockets. These and other objects of the present invention will become better understood with reference to the appended Summary, Description, and Claims.

SUMMARY

The present invention is a fiber filling machine for creating stuffed products such as soft toys and pillows. The fiber filling machine is a stand alone unit that creates its own air flow without the use of compressors. The machine comprises a hopper for receiving fiber, a dispensing assembly below the hopper, a blower and a drive assembly comprising a motor, chains, and sprockets.

The hopper includes a first shaft and a blade assembly mounted on the first shaft for fluffing and dispersing the fiber. The dispensing assembly comprises a housing, a second shaft longitudinally disposed in the housing and a paddle assembly mounted to the second shaft. The housing is open at top for receiving the fiber from the hopper. The housing further includes an inlet aperture that is connected to the blower output and an exit aperture longitudinally opposite the inlet aperture. The paddle assembly is specially designed and includes a plurality of vanes with flexible edges, which contact the surfaces of the housing during rotation. A pocket is created when the apertures are between a pair of the vanes.

The paddle and blade assemblies are controlled by switches and are independent of the blower motor. The fiber from the hopper flows down and is collected between a pair of the vanes, which rotate further to form the pocket filled with fiber. The air from the blower output will then blow the fiber out through the exit aperture when a gate valve is opened by depressing a foot pedal. An auxiliary fiber blower for introducing fiber into the hopper can be used with the fiber filling machine.

FIGURES

Reference Numerals

Figure 1:
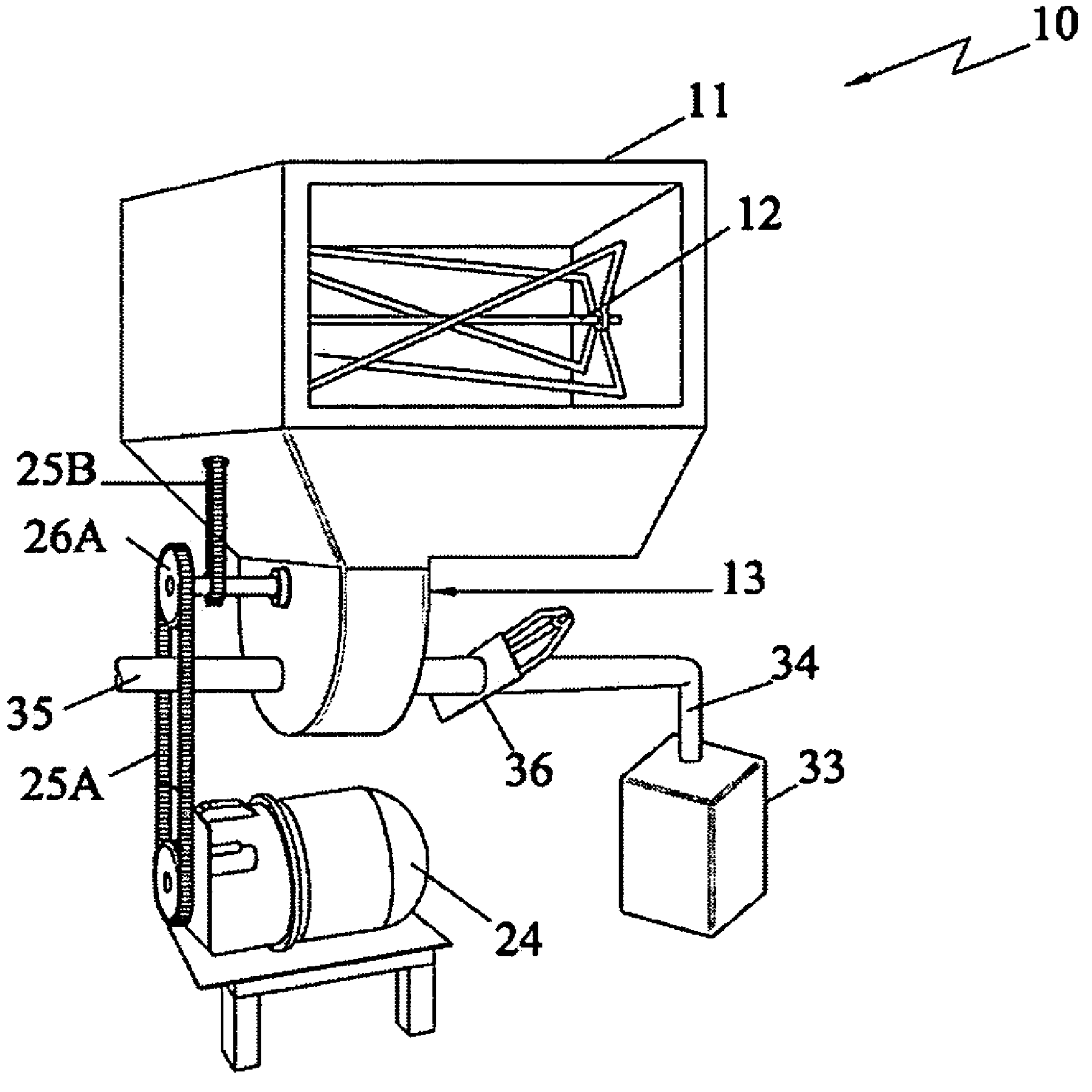
FIG. 1 is an illustration of a perspective view of the fiber filling machine of the present invention.

10 . . . Fiber Filling Machine
11 . . . Hopper
12 . . . First Shaft
13 . . . Dispensing Assembly
14 . . . Housing
15 . . . Second Shaft
16 . . . Paddle Assembly
17 . . . First Semi-circular Surface
18 . . . Second Semi-circular Surface
19 . . . Bottom Surface
20 . . . First Aperture
21 . . . Second Aperture
22 . . . Central Hollow Portion
23 . . . Vane
24 . . . Motor
25 . . . Chain
26 . . . Sprocket
27 . . . Blade of the Paddle Assembly
28 . . . V-shaped Plate
29 . . . Flexible Sheet
30 . . . Pocket
31 . . . Bolt
32 . . . Nut
33 . . . Blower
34 . . . Air Inlet Hose
35 . . . Exit Hose
36 . . . Solenoid
37 . . . Auxiliary Fiber Blowing System
38 . . . Chamber
39 . . . Passageway
40 . . . Partition
41 . . . X-shaped Member
42 . . . Blade in the Hopper
43 . . . Opening
44 . . . Third Hose

DETAILED DESCRIPTION

Referring to the drawings, a preferred embodiment of a fiber filling machine 10 of the present invention is illustrated in FIGS. 1 through 9. The fiber filling machine 10 is a stand alone unit and mainly comprises a hopper, a dispensing assembly, a drive assembly and a blower.

Figure 2:
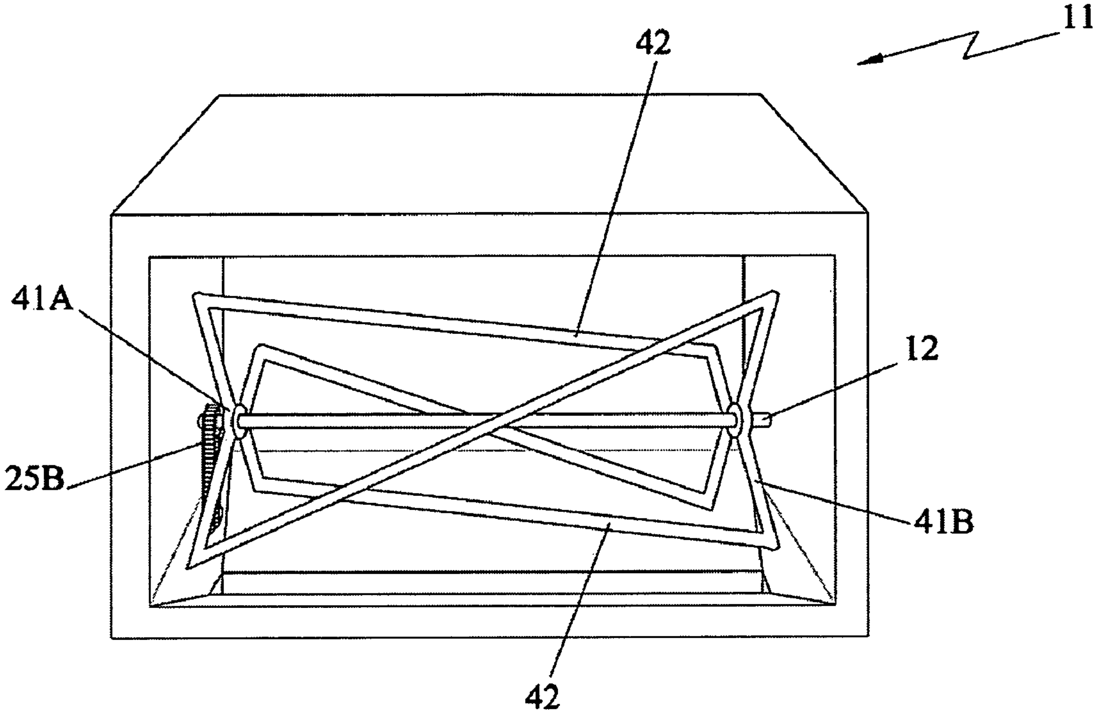
FIG. 2 is an illustration of the hopper and the blade assembly.

Referring to FIGS. 1 and 2, the hopper 11 houses a first shaft 12 and a blade assembly mounted to the first shaft. The first shaft 12 is longitudinally disposed in the hopper. Fiber is introduced in the hopper and the blade assembly is rotated for fluffing and dispersing the fiber. The blade assembly comprises a first X-shaped member 41A, a second X-shaped member 41B at a distance from the first X-shaped member, and four blades 42. The central portions of the X-shaped members 41 include a hole to securely receive the first shaft 12. The blades 42 connect the four free ends of the two X-shaped members 41. Specifically, the four blades 42 connect first, second, third, and fourth free ends of the first X-shaped member 41A to the second, third, fourth, and first free ends of the second X-shaped member 41B, respectively.

Figure 3:
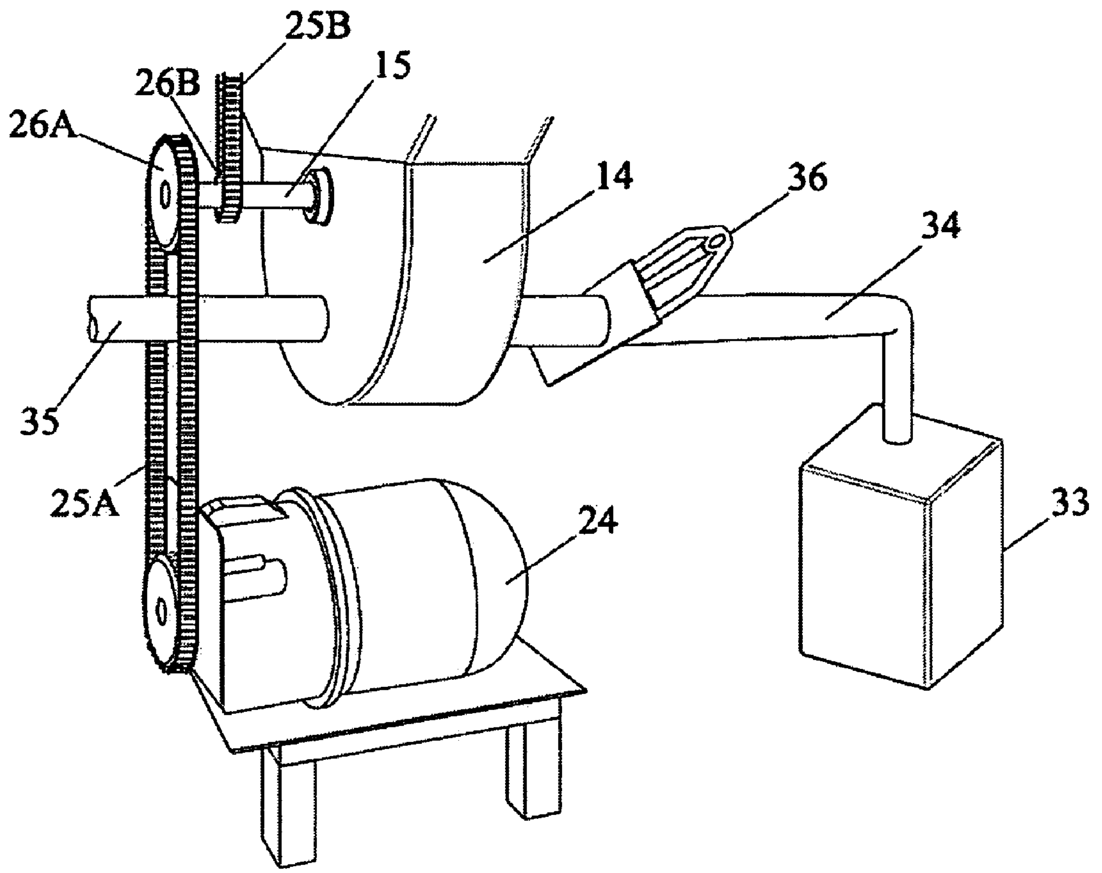
FIG. 3 is an illustration of a partial perspective view of the fiber filling machine, showing the dispensing assembly, motor, and blower.
Figure 4:
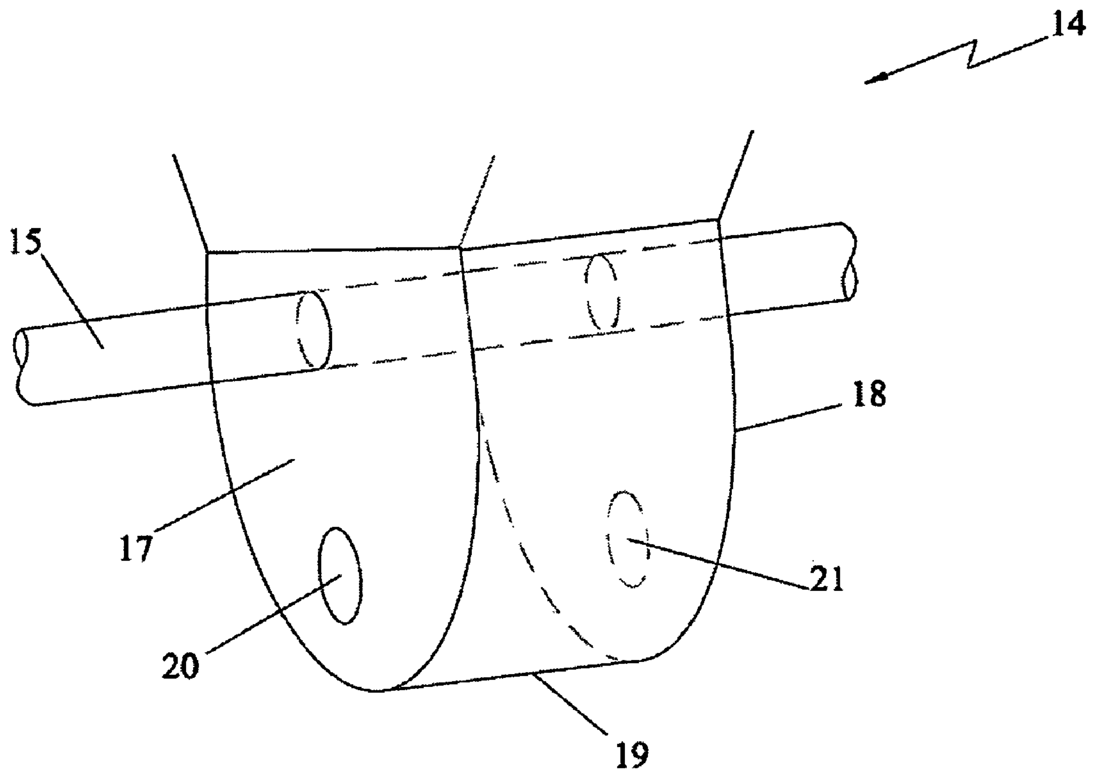
FIG. 4 is an illustration of the housing of the dispensing assembly.

Referring to FIGS. 3 and 4, the dispensing assembly 13 comprises a housing 14, a second shaft 15 longitudinally disposed in the housing and a paddle assembly 16. The housing 14 is disposed below the hopper 11 for receiving the fiber. The housing is defined by a first substantially semi-circular surface 17 with its curved side facing down, a second substantially semi-circular surface 18 opposite the first surface with its curved side facing down and a bottom surface 19 in connection with the curved sides of the first and second surfaces. The first surface 17 includes a first aperture 20 and the second surface includes a second aperture 21 that is in line with the first aperture. The width of the bottom surface 19 is defined by the distance between the first and second surfaces. The top of the housing 14 defines an opening that is contiguous with the hopper 11 for receiving the fiber.

Figure 5:
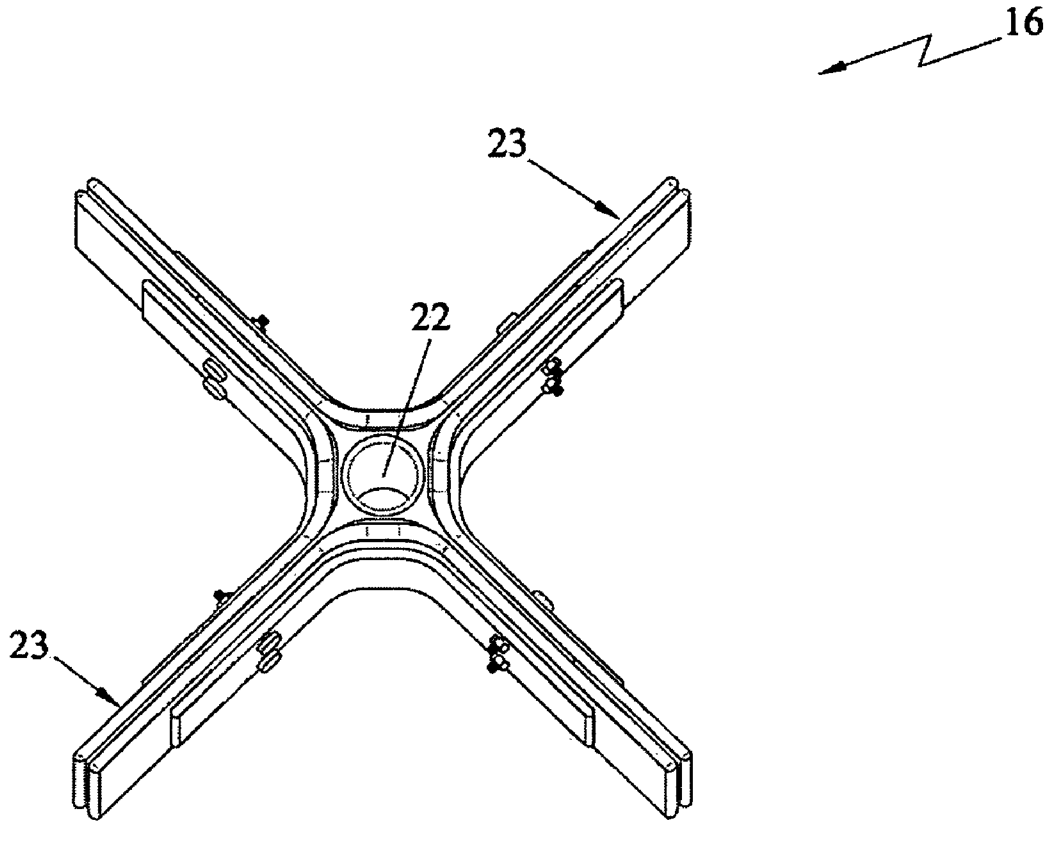
FIG. 5 is a perspective view of the paddle assembly.

The second shaft 15 is longitudinally disposed between the first and second surfaces 17 and 18 of the housing and above the first and second apertures 20 and 21. The paddle assembly 16 comprises a central hollow portion 22 and four vanes 23 projecting from the central hollow portion in a radial orientation, as seen in FIG. 5. The second shaft 15 is securely received in the central hollow portion 22 for rotating the paddle assembly.

Referring to FIG. 3, the drive assembly of the present invention comprises a single motor 24 for rotating both the first and second shafts 12 and 15 by chains and sprockets. A first chain 25A is used to connect the motor output and a first sprocket 26A on the second shaft 15. A second chain 25B is used to connect a second sprocket 26B on the second shaft 15 and a sprocket on the first shaft 12. Therefore, the motor 24 rotates both the paddle assembly and the blade assembly. The number of teeth and the diameter of the sprockets are selected to achieve the desired rotations per minute for the paddle and blade assemblies.

Figure 6:
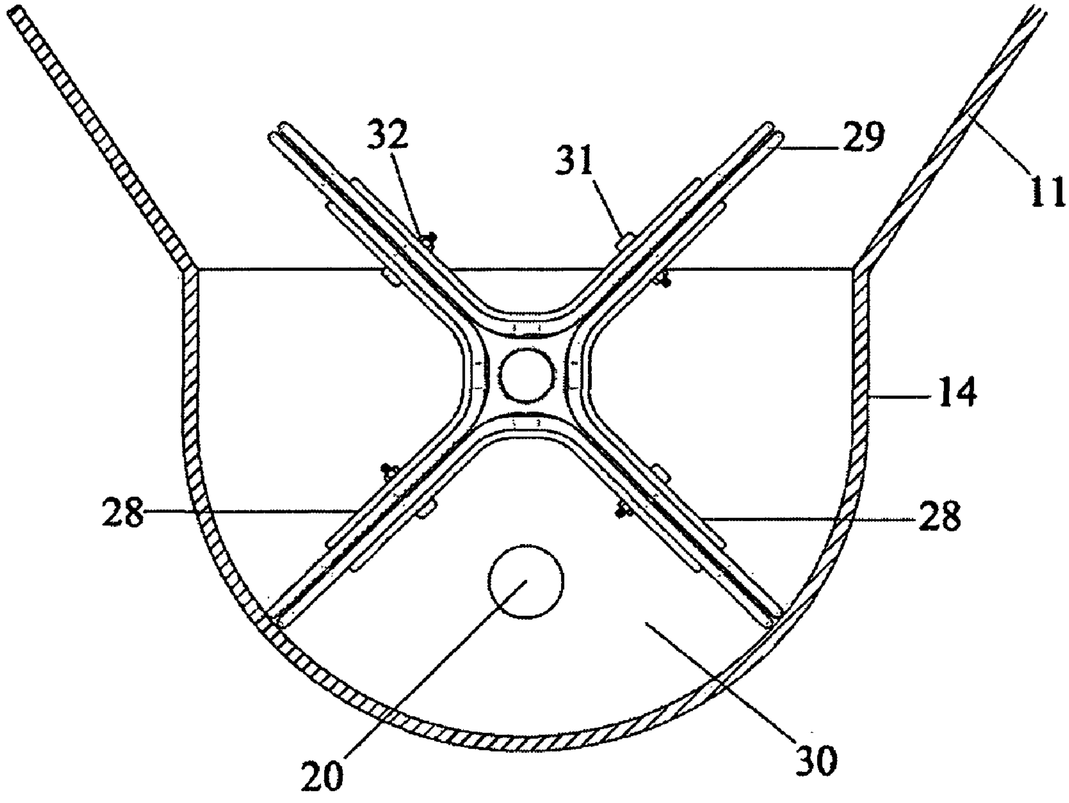
FIG. 6 is a partial sectional view showing the paddle assembly and the housing.
Figure 7:
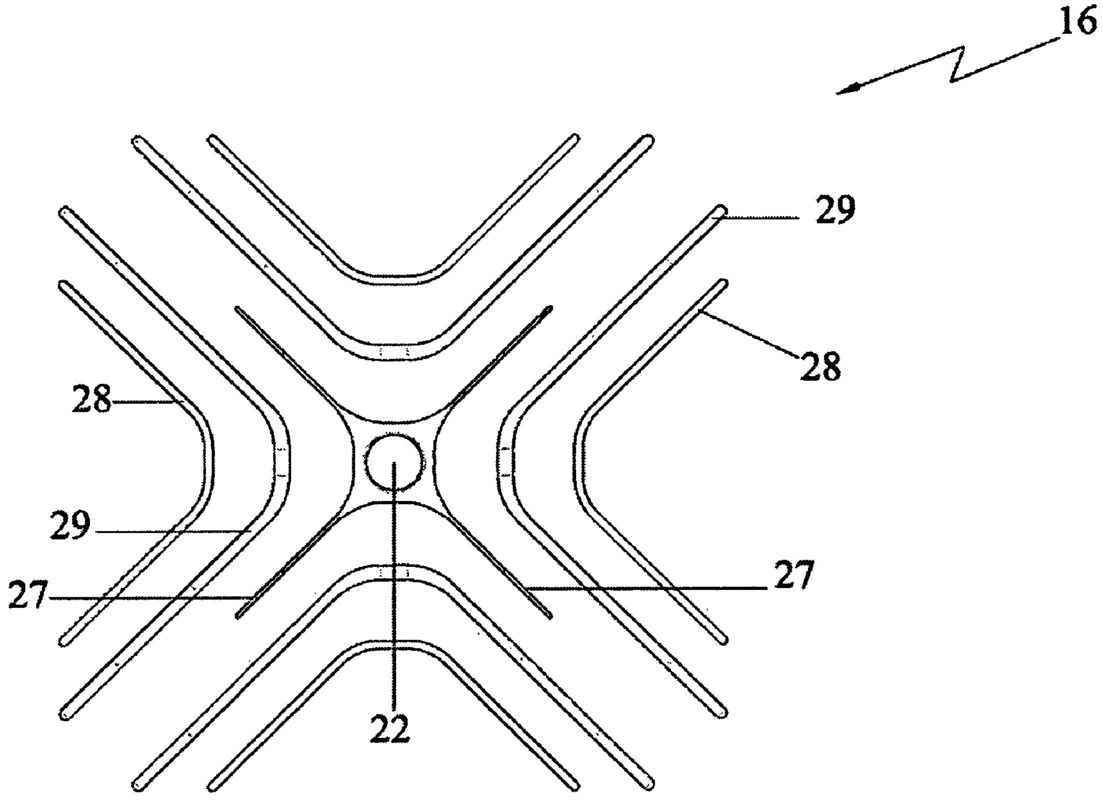
FIG. 7 is an exploded plan view of the paddle assembly, showing the hollow central portion, blades, and V-shaped plates.

Referring to FIGS. 5 through 7, the paddle assembly 16 will now be described in detail. The assembly comprises a plurality of blades 27 projecting from the central hollow portion 22 in a radial orientation, an equal number of substantially V-shaped plates 28 and an equal number of flexible sheets 29. In order to form the vanes 23, each flexible sheet 29 is first overlapped over two adjacent blades 27 and a V-shaped plate 28 is then secured over the flexible sheet. The sheets 29 extend beyond the boundaries of the blades 27 and the V-shaped plates 28. The sheets 29 are dimensioned such that their edges contact the first, second and bottom surfaces 17, 18 and 19 of the housing during rotation of the paddle assembly. Also, during rotation, a pocket 30 is created when the first and second apertures 20 and 21 are between a pair of vanes. Due to the flexible edges of the sheets 29, the pocket 30 is substantially isolated from the hopper and the rest of the dispensing assembly.

The sheets 29 are made of rubber or other flexible and durable materials. The sheets are secured by using fasteners such as bolts 31 and nuts 32, and therefore, they are removable and can be replaced when worn out.

The output of the blower 33 is connected to the first aperture 20 using an air inlet hose 34. An exit hose 35 is connected to the second aperture 21. An inline gate valve is included in the air inlet hose 34. The inline gate valve is operated by an electric solenoid 36 switch in order to allow the air to pass through the air inlet hose 34 into the housing. The electric solenoid switch is associated with a foot pedal (not shown). When the foot pedal is depressed, the solenoid 36 will open the gate valve. The solenoid 36 will close the gate valve when the foot pedal is released. This feature is designed to allow the flow of the fiber and also to stop any overflow of fiber once stuffing is complete.

In order to operate the fiber filling machine 10, the motor 24 is activated by a switch (not shown). The shafts 12 and 15, and in turn, the blade and paddle assemblies start rotating. Fiber introduced in the hopper 11 is dispersed and gets collected between a pair of the vanes 23 of the paddle assembly 16. As the paddle assembly rotates further, the pocket 30 is created when the first and second apertures 20 and 21 are between a pair of vanes. The pocket 30 now contains the fiber. The foot pedal is depressed to engage the blower 33 and open the gate valve. The air from the blower output flows into the pocket 30 through the first aperture 20 and blows the fiber out through the second aperture 21 into the exit hose 35. The outlet of the exit hose 35 is inserted in a hollow cavity of a toy, pillow or other similar product that needs to be stuffed with fiber. The hollow cavity is then filled with appropriate amount of fiber.

Figure 8:
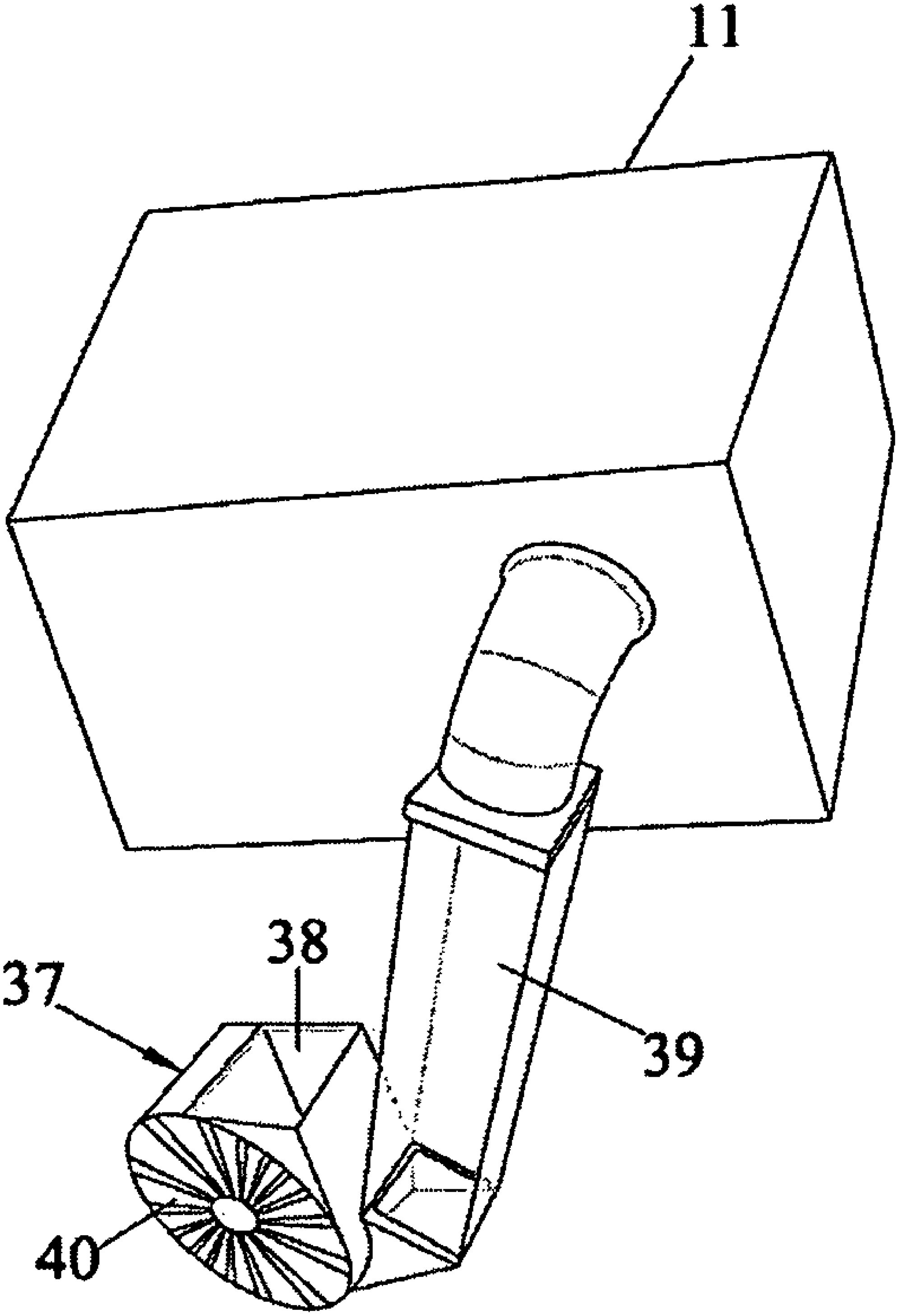
FIG. 8 is an illustration of the auxiliary fiber blowing system, which can be used with the fiber filling machine to blow fiber into the larger hopper.
Figure 9:
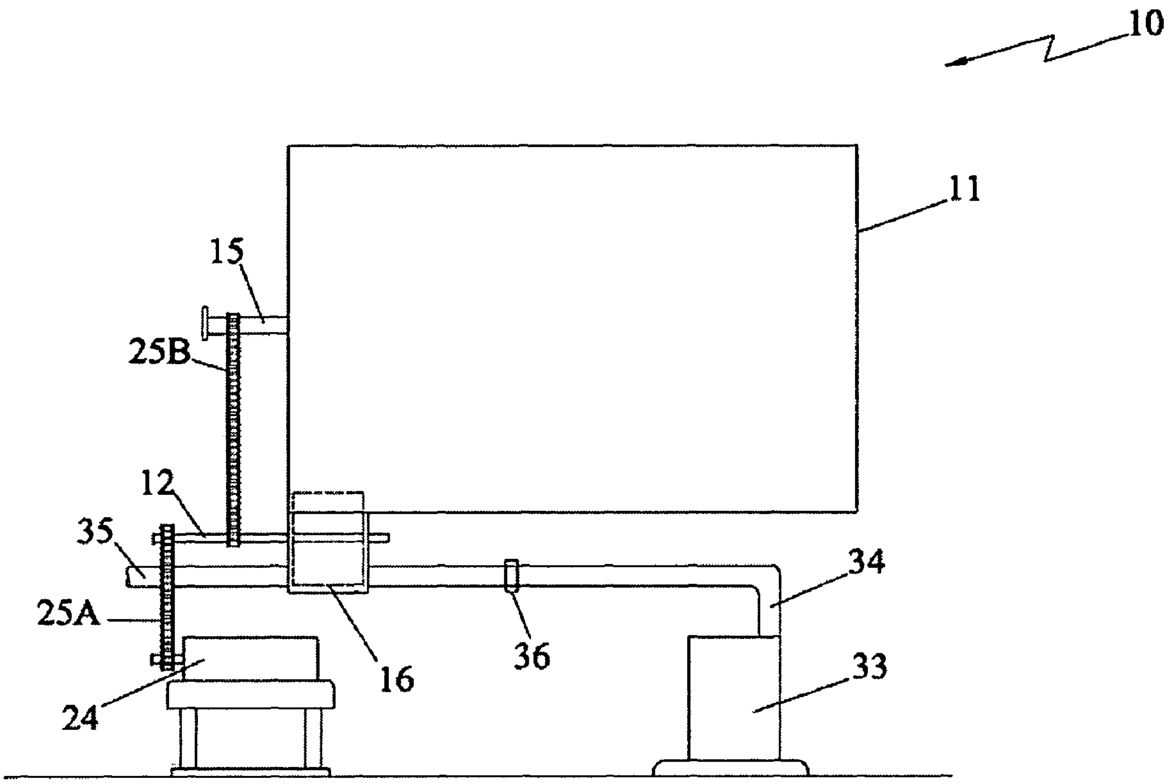
FIG. 9 is an illustration of the inner construction of the chamber of the auxiliary fiber blowing system.
Figure 10:
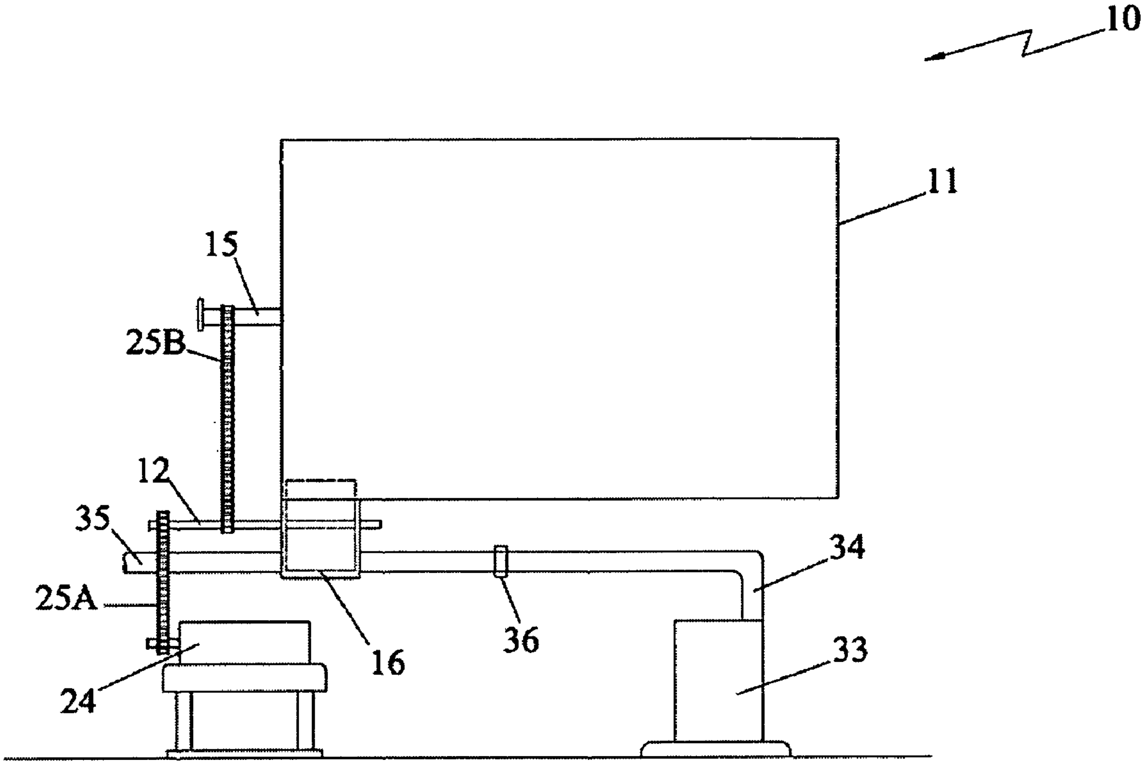
FIG. 10 is an illustration of a plan view of the fiber filling machine, showing its construction.

Referring to FIGS. 8 and 9, the present invention can be provided with an auxiliary fiber blowing system 37 for blowing the fiber into the hopper. The auxiliary fiber blowing system 37 comprises a chamber 38 and a passageway 39 connecting the chamber 37 and the hopper 11. The chamber has two sections divided by a Partition 40. The first section includes an opening at top for receiving the fiber. The bottom portion of the first section is contiguous with the passageway 39. The partition includes an aperture at its bottom. A third hose is used to connect this aperture to the blower output. Fiber introduced from the opening is first collected at the bottom of the first section and then blown by the air from blower output into the hopper 11 through the passageway 39.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A fiber blowing and filling machine comprising:

a. a hopper for receiving fiber, wherein the hopper houses a first shaft longitudinally disposed in the hopper and a blade assembly comprising a first X-shaped members and a second X-shaped member disposed at each end of the first shaft and at least four blades running diagonally to the first shaft and connected to the first and second X-shaped members, wherein the four blades connect the first, second, third, and fourth free ends of the first X-shaped member to the second, third, fourth and first free ends of the second X-shaped member, respectively, for fluffing and dispersing the fiber as the first shaft is rotated;

b. a dispensing assembly located below the hopper, comprising:

i. a housing open on top;

ii. a first aperture on a first surface of the housing;

iii. a second aperture on a second surface of the housing opposite the first surface, the second aperture being in line with the first aperture;

iv. a second shaft longitudinally disposed between the first and second surfaces of the housing and above the first and second apertures;

v. a paddle assembly comprising a hollow central portion and a plurality of vanes with flexible edges projecting from the central portion in a radial orientation, the paddle assembly mounted over the second shaft by securely receiving the second shaft within the hollow central portion creating a pocket when the first and second apertures are between a pair of the vanes, the edges of which contact the surfaces of the housing such that the pocket created is substantially isolated from the hopper and rest of the dispensing assembly;

c. a drive assembly for rotating the first and second shafts;

d. a blower;

e. an air inlet hose connecting the blower output and the first aperture in the housing; and f. an exit hose connected to the second aperture wherein, when the blower and the drive assembly are activated, the fiber in the hopper is dispersed and gets collected between a pair of the vanes, which rotate further creating the pocket filled with the fiber to be blown into the exit hose by the air from the blower output, wherein the paddle assembly comprises a plurality of blades projecting from the central hollow portion in a radial orientation, an equal number of substantially V-shaped plates, and an equal number of flexible sheets whose length from one end of the sheet to the other end of the sheet is longer than the length of any of the V-shaped plates from one end of the plate to the other end of the plate, the flexible sheets, in major part, secured between the V-shaped plates and a pair of the subsequent blades, thereby forming the vanes.

2. The fiber blowing machine of claim 1, wherein the housing of the dispensing assembly comprises a top defining an opening for receiving the fiber from the hopper, a first substantially semi-circular surface with its curved side facing down, a second substantially semi-circular surface opposite the first surface with its curved side facing down, and a bottom surface in connection with the curved sides of the first and second surfaces and having a width defined by the distance between the first and second surfaces.

3. The fiber blowing machine of claim 1, wherein the edges of the vanes being flexible contact the first, second and bottom surfaces of the housing during rotation such that the pocket created is isolated from the hopper and rest of the dispensing assembly.

4. The fiber blowing machine of claim 1, wherein the sheets are dimensioned such that they extend beyond the boundaries of the blades and the V-shaped plates.

5. The fiber blowing machine of claim 4, wherein the edges of the sheets contact the first, second and bottom surfaces of the housing during rotation for creating the pocket that is isolated from the hopper and rest of the dispensing assembly.

6. The fiber blowing machine of claim 1, wherein the flexible sheets are made of rubber or other flexible and durable materials.

7. The fiber blowing machine of claim 1, wherein the flexible sheets are secured between the V-shaped plates and the blades using fasteners such as bolts and nuts.

8. The fiber blowing machine of claim 1, wherein the flexible sheets are removable to facilitate replacement.

9. The fiber blowing machine of claim 1, wherein the paddle assembly comprises a plurality of blades projecting from the central hollow portion in a radial orientation, an equal number of substantially V-shaped plates, and an equal number of flexible sheets secured between the V-shaped plates and a pair of the subsequent blades, thereby forming the vanes, the sheets being dimensioned such that they extend beyond the boundaries of the blades and the V-shaped plates so that their edges contact the surfaces of the housing for creating the pocket.

10. The fiber blowing machine of claim 9, wherein the flexible sheets and are made of rubber or other flexible and durable materials.

11. The fiber blowing machine of claim 9, wherein the flexible sheets are secured between the V-shaped plates and the blades using fasteners such as bolts and nuts to facilitate replacement.

12. The fiber blowing machine of claim 1, wherein the drive assembly comprises a single motor driving both the first and second shafts by chains and sprockets.

13. The fiber blowing machine of claim 12, wherein the drive assembly comprises a motor, a first chain connecting the motor output and a first sprocket associated with the second shaft, and a second chain connecting a second sprocket associated with the second shaft and a third sprocket associated with the first shaft.

14. The fiber blowing machine of claim 1, wherein the machine is a stand alone unit.

15. The fiber blowing machine of claim 1, wherein the machine further comprises a storage chamber for temporarily storing the fiber and an auxiliary blower below the storage chamber for blowing the fiber into the hopper.

16. The fiber blowing machine of claim 1, wherein the machine comprises an inline gate valve associated with the air inlet hose and an electric solenoid switch for operating the inline gate valve to allow the air from the blower to pass through the air inlet hose into the dispensing assembly and to stop overflow of the fiber once stuffing is complete.

17. The fiber blowing machine of claim 16, wherein the electric solenoid switch is associated with a foot pedal, the solenoid opens the gate valve when the foot pedal is depressed and closes the gate valve when the foot pedal is released.

* * * * *